UNITED STATES PATENT OFFICE.

PHILIPP MÜLLER, JR., OF FRANKFORT-ON-THE-MAIN, GERMANY.

MANUFACTURE OF ALIMENTARY PRODUCTS.

No. 863,081.     Specification of Letters Patent.     Patented Aug. 13, 1907.

Application filed October 12, 1906. Serial No. 338,557.

*To all whom it may concern:*

Be it known that I, PHILIPP MÜLLER, Jr., a subject of the Emperor of Germany, and a resident of Frankfort-on-the-Main, Germany, have invented certain new and useful Improvements in the Manufacture of Alimentary Products, of which the following is a specification.

This invention relates to the manufacture of a food (for the use more particularly of infants) prepared in a solid form from buttermilk, flour and sugar, and has for its chief object to provide a process whereby the food, while capable of being kept an indefinite length of time, shall be rendered specially easy of digestion, so as to be adapted for administration even to suckling children.

A characteristic feature of the present invention consists in the fact that the sterilized intermediate product is stored in closed vessels for a lengthy period, say 6 weeks before being evaporated to dryness in the well-known manner. In consequence of this storage of the intermediate product, the final product is rendered easily digestible and much more nourishing and is of uniform, constant constitution and of unlimited permanency.

The process is carried out in the following manner:—
I take raw buttermilk, whose acidity must not exceed a point at which 5 cubic centimeters of a normal alkaline solution will suffice to neutralize 100 cubic centimeters of the buttermilk. Such buttermilk I mix with flour and sugar in the proportion of 15 grams of flour and 60 grams of cane sugar to 1 liter of buttermilk. The mixture is prepared as follows: 15 grams of flour are added to one liter of buttermilk and the liquid treated on an open fire under constant stirring until it boils, and is kept boiling and agitated for about from 10 to 15 minutes. 60 grams of cane sugar are added during the heating. This mixture is then boiled three times in the usual manner, with constant stirring, then poured at a temperature of about 90 degrees centigrade into previously sterilized vessels, and when the vessels have been closed, is heated for a short period (say for 10 minutes) at a temperature of 100 degrees centigrade. Before the product, obtained as described, is desiccated, it is subjected to storage in air-tight closed vessels at a temperature of about 18 degrees centigrade. The aforesaid heating at a temperature of 100 degrees centigrade has for its object to render the percentage of acid in the buttermilk unalterable. For manufacturing a food in a dry form the acidity should not fall below the point mentioned above, as in this case carbonic acid is generated in the mixture after a short time. But in the other case, the acidity should not appreciably exceed said point in order that the food shall be nourishing.

During the period of storage after the short sterilization conversion of the cane sugar and of the other constituents of the food takes place, which conversion is completed after storage of about 6 weeks as is proved by analysis, which at the end of such period reveals no cane sugar or only traces of it. After this storage the food has a fixed and unchanging composition and can therefore be desiccated without the risk of any appreciable chemical change taking place so that the food can be placed on the market in the solid form, stored for an unlimited period of time, and made ready for use by dissolving it in water.

What I claim as new and of my invention and desire to secure by Letters Patent is:—

The herein described process for the manufacture of an alimentary product for the use more particularly of infants, which consists in mixing raw buttermilk of an acidity not exceeding the point at which 5 cubic centimeters of a normal alkaline solution will suffice to neutralize 100 cubic centimeters of the buttermilk, with flour, heating and stirring the mixture until it boils and keeping it boiling and agitated, adding sugar during the heating operation, boiling the mixture repeatedly, subjecting the product to sterilization in a closed vessel for about ten minutes, storing the sterilized product in a closed vessel for about six weeks for rendering the product permanent and easy of digestion and then evaporating to dryness.

In testimony, that I claim the foregoing as my invention I have signed my name in presence of two witnesses, this first day of October 1906.

PHILIPP MÜLLER, JUN.

Witnesses:
  H. SCHUMACHER,
  M. HAUNKE.